(12) United States Patent
Negishi

(10) Patent No.: US 11,182,571 B2
(45) Date of Patent: Nov. 23, 2021

(54) MAGNETIC RECORDING MEDIUM PROCESSING DEVICE AND CONTROL METHOD

(71) Applicant: NIDEC SANKYO CORPORATION, Nagano (JP)

(72) Inventor: Akihiro Negishi, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 16/744,691

(22) Filed: Jan. 16, 2020

(65) Prior Publication Data
US 2020/0234012 A1 Jul. 23, 2020

(30) Foreign Application Priority Data
Jan. 17, 2019 (JP) .............................. JP2019-005730

(51) Int. Cl.
*G06K 7/10* (2006.01)
*G06K 19/06* (2006.01)

(52) U.S. Cl.
CPC ... *G06K 7/10128* (2013.01); *G06K 19/06196* (2013.01)

(58) Field of Classification Search
CPC ......... G06K 7/10128; G06K 19/06196; G06K 9/06196
See application file for complete search history.

(56) References Cited

U.S. PATENT DOCUMENTS

| | | | | |
|---|---|---|---|---|
| 4,296,315 A * | 10/1981 | Weimer | ........... | G06K 19/06187 235/450 |
| 5,233,658 A * | 8/1993 | Bianco | ..................... | G06F 21/34 235/449 |
| 8,584,947 B2 * | 11/2013 | Mitchell | ............... | G07F 19/209 235/449 |
| 10,824,827 B2 * | 11/2020 | Momose | ........... | G06K 7/10217 |
| 2007/0131768 A1 * | 6/2007 | Wakabayashi | ....... | G06Q 20/341 235/449 |
| 2009/0078765 A1 * | 3/2009 | Leong | .................... | G06K 7/082 235/449 |
| 2009/0159676 A1 * | 6/2009 | Schliebe | .................. | G07F 7/08 235/436 |

(Continued)

FOREIGN PATENT DOCUMENTS

JP H05114056 A 5/1993

*Primary Examiner* — Daniel I Walsh
(74) *Attorney, Agent, or Firm* — Cantor Colburn LLP

(57) ABSTRACT

A card reader for processing an inserted magnetic card may be equipped with a front sensor arranged in the vicinity of an insertion opening for a magnetic card to detect the insertion of the magnetic card, a rear sensor for detecting the magnetic card when the magnetic card is fully inserted, a magnetic field generating unit for generating a magnetic field in the vicinity of the insertion opening for a magnetic card, and a control unit for controlling a magnetic field to be generated by said magnetic field generating unit at a first strength or at a second strength weaker than the first strength. The control unit may control the strength of the magnetic field to be generated by the magnetic field generating unit at the second strength while the first time period elapses after the rear sensor has detected the magnetic card and then has stopped sensing it.

15 Claims, 3 Drawing Sheets

(56) References Cited

U.S. PATENT DOCUMENTS

| | | | |
|---|---|---|---|
| 2011/0006112 A1* | 1/2011 | Mueller | G07F 7/1008 |
| | | | 235/379 |
| 2011/0135092 A1* | 6/2011 | Lehner | G07F 19/2055 |
| | | | 380/252 |
| 2013/0062410 A1* | 3/2013 | Mitchell | G06K 13/0868 |
| | | | 235/449 |
| 2013/0299582 A1* | 11/2013 | Ozawa | G06K 13/0875 |
| | | | 235/440 |
| 2014/0158768 A1* | 6/2014 | Ray | H04K 3/825 |
| | | | 235/449 |
| 2014/0332591 A1* | 11/2014 | Ishikawa | G07F 19/2055 |
| | | | 235/449 |
| 2014/0372305 A1* | 12/2014 | Ray | G07F 19/2055 |
| | | | 705/44 |
| 2016/0232385 A1* | 8/2016 | Takeda | G07F 19/2055 |
| 2016/0283754 A1* | 9/2016 | Hoson | G06K 7/082 |
| 2017/0018135 A1* | 1/2017 | Sakamaki | G06K 7/087 |
| 2017/0061745 A1* | 3/2017 | Kobayashi | G07F 19/202 |
| 2017/0124359 A1* | 5/2017 | Fujimoto | G06K 7/087 |
| 2017/0140180 A1* | 5/2017 | Hoson | G06K 7/087 |
| 2018/0075263 A1* | 3/2018 | Ishikawa | G06K 7/087 |
| 2018/0107908 A1* | 4/2018 | Park | G06K 7/084 |
| 2018/0196971 A1* | 7/2018 | Sakamaki | G06K 7/084 |
| 2018/0293410 A1* | 10/2018 | Suzuki | G07F 7/0873 |
| 2019/0340395 A1* | 11/2019 | Suzuki | H04K 3/825 |
| 2019/0384945 A1* | 12/2019 | Momose | G06K 7/0008 |
| 2019/0384949 A1* | 12/2019 | Momose | G06K 7/10267 |
| 2020/0097641 A1* | 3/2020 | Washiro | G06F 21/32 |
| 2020/0234012 A1* | 7/2020 | Negishi | G06K 19/06196 |
| 2020/0302129 A1* | 9/2020 | Higashi | G06K 13/067 |

* cited by examiner

MAGNETIC RECORDING MEDIUM PROCESSING DEVICE AND CONTROL METHOD

CROSS REFERENCE TO RELATED APPLICATION

The present application claims priority under 35 U.S.C. § 119 to Japanese Patent Application No. 2019-005730 filed on Jan. 17, 2019, the entire content of which is incorporated herein by reference.

FIELD OF TECHNOLOGY

The present invention relates to a magnetic recording medium processing device and a control method thereof.

BACKGROUND OF TECHNOLOGY

In recent years there has been an increase in the crime of skimming which steals information recorded on a magnetic card such as a debit card. As a counter measure against skimming a technology has been introduced of generating an interfering magnetic field around a card insertion opening of a card reader, which is a magnetic recording medium processing device. While the insertion of a magnetic card needs to be accurately detected, a card of a unique shape, due to a non-standard size or a damaged part in the card, may be inserted. To judge if such a card of a unique shape is inserted, a technology has been considered which measures the time a card in transfer passes sensors; the insertion of a card is judged, based on the time measured (Patent reference 1, for example).

RELATED ART REFERENCE

Patent Reference

[Patent Reference] Unexamined Japanese Patent Application 5-114056 Publication

SUMMARY OF THE INVENTION

Problems to Solve and Objective to Achieve

In a magnetic recording medium processing device to which a magnetic card is inserted by hand, the relationship between the transfer speed and the card size is not consistent; therefore, it is difficult for the above-mentioned technology to detect a magnetic card of different size or one with a missing part. If the magnetic recording medium processing device cannot detect a card, it may lose track of the inserted card; consequently, the processing on the magnetic card may be affected by an interfering magnetic field.

An objective to the present invention is to provide a magnetic recording medium processing device by which the processing on a magnetic card is not affected by an interfering magnetic field and a control method thereof.

Means to Solve and Achieve

To solve the above-mentioned problems, a magnetic recording medium processing device of the present invention may be a magnetic recording medium processing device for reading information from an inserted magnetic card and writing information on the magnetic card, which includes a first detecting unit provided in the vicinity of an insertion opening for the magnetic card for sensing the insertion of the magnetic card, a second detecting unit for sensing the magnetic card when the insertion of the magnetic card is completed, a magnetic field generating unit for generating a magnetic field in the vicinity of the insertion opening for the magnetic card, and a control unit for controlling a magnetic field to be generated by the magnetic field generating unit at a first strength or at a second strength which is weaker than the first strength;

and in which the control unit controls the strength of the magnetic field to be generated by the magnetic field generating unit at the second strength during a first time period after the second detecting unit detects the magnetic card and then no longer detects the magnetic card.

The magnetic recording processing device of at least an embodiment of the present invention may control the strength of the magnetic field to be generated by the magnetic field generating unit, making it weaker for a certain time period after the second detecting unit no longer detected the magnetic card until a predetermined time period elapses. Therefore, the influence of the interfering magnetic field on the processing of the magnetic card can be avoided.

In the magnetic recording medium processing device of at least an embodiment of the present invention, the control unit may control the strength of the magnetic field to be generated by the magnetic field generating unit at the first strength until a magnetic card is inserted and controls it at the second strength during a second time period after the magnetic card is inserted and the first detecting unit detects the magnetic card. In this way, even when a magnetic card is inserted into a magnetic recording medium processing device, the reading of information on the magnetic card or the writing of information to the magnetic card can be accurately performed.

In the magnetic recording medium processing device of at least an embodiment of the present invention, when the first detecting unit detects the magnetic card, followed by the second detecting unit sensing the magnetic card, the control unit may control the strength of the magnetic field to be generated by the magnetic field generating unit at the first strength. In this way, the information on the magnetic card can be protected from being stolen fraudulently, increasing security.

In the magnetic recording medium processing device of at least an embodiment of the present invention, if the first detecting unit detects the magnetic card during a third time period after the second detecting unit detects the magnetic card, the control unit may control the strength of the magnetic field to be generated by the magnetic field generating unit at the second strength. In this way, even if the first detecting unit does not detect the magnetic card even when the third time period elapses after the second detecting unit detects the magnetic card, the information on the magnetic card can be protected from being stolen fraudulently, increasing security.

In the magnetic recording medium processing device of at least an embodiment of the present invention, once the first detecting unit detects the magnetic card after the second detecting unit detects the magnetic card and then stops sensing the card, the control unit may control the strength of the magnetic field to be generated by the magnetic field generating unit at the second strength until the first detecting unit stops sensing the card. In this case, the magnetic card can be processed without the influence of the interfering magnetic field until the magnetic card is completely pulled out of the magnetic recording processing device.

In the magnetic recording medium processing device of at least an embodiment of the present invention, the distance between the position at which the first detecting unit detects the magnetic card and the position at which the second detecting unit detects the card may be the same as the length of the magnetic card in the insertion direction. In this way, the time period to control the interfering magnetic field at the weaker strength can be kept to a minimum.

In the magnetic recording medium processing device of at least an embodiment of the present invention, the magnetic card may be inserted and removed by hand. In this way, even when the insertion of a medium into the information reading device is done by hand, which means the relationship between the transfer speed of the medium insertion and the medium size may not be kept consistent, losing tack of the medium can be prevented.

To solve the above-mentioned problems, the control method of at least an embodiment of the present invention may include a processing of sensing the insertion of a magnetic card in the vicinity of an insertion opening for a magnetic card, a processing of sensing the magnetic card at an insertion complete position at which the magnetic card can be detected when the card is completely inserted, a processing of generating a magnetic field in the vicinity of the insertion magnetic card, a processing of controlling of a generating magnetic field at a first strength or at a second strength which is weaker than the first strength, and a processing of controlling a generating magnetic field at the second strength while the first time period elapses after the magnetic card is detected at the insertion complete position and then is no longer detected at the insertion complete position.

The control method of at least an embodiment of the present invention may control a magnetic field to be generated by the magnetic field generating unit at a weaker strength during a predetermined time period after the second detecting unit no longer stops sensing the magnetic card. In at least an embodiment of the present invention, therefore, the influence of the interfering magnetic field on the processing of the magnetic card can be avoided.

Effects of the Invention

As described above, the influence of the interfering magnetic field on the processing of a magnetic card can be avoided.

DETAILED DESCRIPTION OF THE INVENTION

Figure 1:
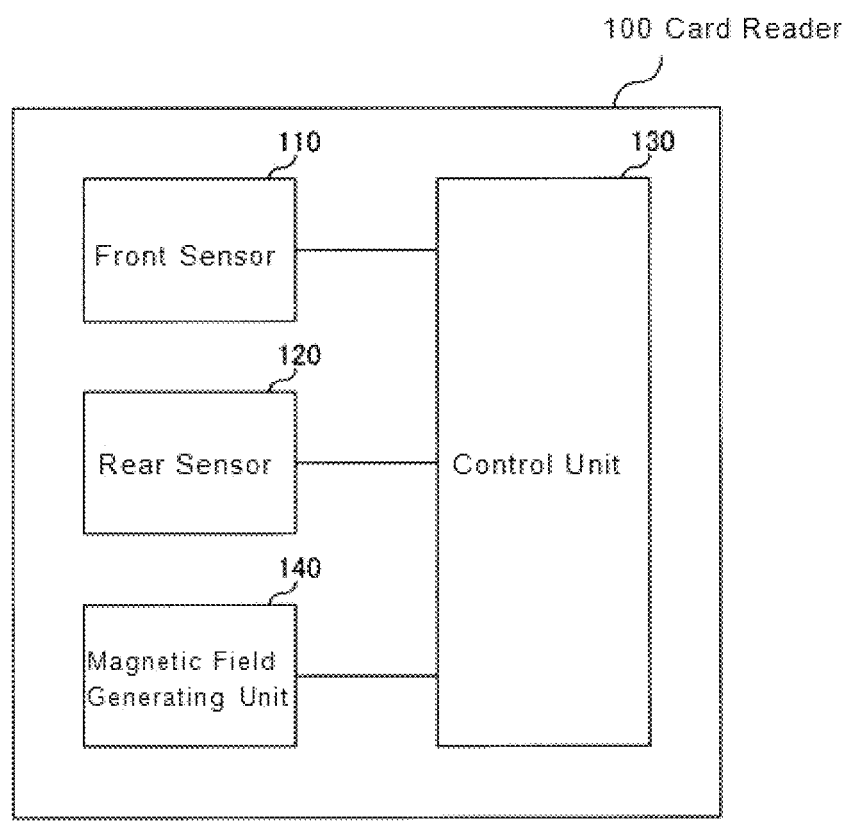
FIG. 1 is a diagram showing an embodiment of a magnetic recording medium processing device of the present invention.

An embodiment of the present invention is described hereinafter referring to the drawings.

FIG. 1 is a diagram of an embodiment of a magnetic recording medium processing device of the present invention. As shown in FIG. 1, a card reader 100, which is a magnetic recording medium processing device in this embodiment, has a front sensor 110, a rear sensor 120, a control unit 130 and a magnetic field generating unit 140. Note that FIG. 1 shows only major components among those that are equipped in the magnetic recording medium processing device in this embodiment. The card reader 100 is a magnetic recording medium processing device for reading information written on a magnetic card, which is a medium inserted by hand, and writing information on the magnetic card. The medium is also removed from the card reader 100 by hand.

The front sensor 110, arranged near a magnetic card insertion opening of the card reader 100, is a first detecting unit to detect a magnetic card. The front sensor 110 may detect a magnetic card by sensing the raising-up of a lever equipped in the card reader 100 when the magnetic card is inserted.

The rear sensor 120 is a second detecting unit which is provided at the position at which to detect the magnetic card when the magnetic card is completely inserted into the card reader 100. The rear sensor 120 may adopt one which judges the completion of the insertion of a magnetic card when an IC (Integrated Circuit) contact block is pushed in by the magnetic card at the completion of the insertion into the card reader 100.

The magnetic field generating unit 140 generates a certain magnetic field in the vicinity of the magnetic card insertion opening. The magnetic field is an interfering magnetic field which is generated at the card insertion opening of the card reader 100 as a countermeasure against skimming which steals information recorded on a magnetic card.

The control unit 130 controls the strength of the magnetic field to be generated by the magnetic field generating unit 140, based on the detection result by the front sensor 110 and the detection result by the rear sensor 120. The control unit 130 controls the strength of the magnetic field to be generated by the magnetic field generating unit 140 at a first strength or at a second strength which is weaker than the first strength. This control may be performed through the control of the voltage applied to the magnetic field generating unit 140 or the control of the current applied to the magnetic field generating unit 140. Note that in the following description, the magnetic field at the first strength is noted as a stronger magnetic field and the magnetic field at the second strength is noted as a weaker magnetic field.

The control by the control unit 130 is further described in detail hereinafter. Also, the control unit 130 controls the magnetic field to be generated by the magnetic field generating unit 140 to the weaker magnetic field strength while a certain time period (the first period) elapses after the rear sensor 120 detects the magnetic card and then stops sensing the card. The control unit 130 also controls the magnetic field to be generated by the magnetic field generating unit 140 to the weaker magnetic field when, after the rear sensor 120 detects the magnetic card and then stops sensing the card, the front sensor 110 detects the magnetic card and maintains it until the front sensor 110 no longer detects the magnetic card. The control unit 130 also controls the magnetic field to be generated by the magnetic field generating unit 140 to the weaker magnetic field while a certain time period (the second period) elapses after the magnetic card is inserted and the front sensor 110 detects the magnetic card. Also, the control unit 130 controls the magnetic field to be generated by the magnetic field generating unit 140 to the stronger magnetic field when, after the front sensor 110 detects the magnetic card, the rear sensor 120 detects the magnetic card. Further, the control unit 130 controls the magnetic field to be generated by the magnetic field generating unit 140 to the weaker magnetic field when the front sensor 110 detects the magnetic card while a certain time period (the third period) elapses after the rear sensor 120 detects the magnetic card.

Figure 2:
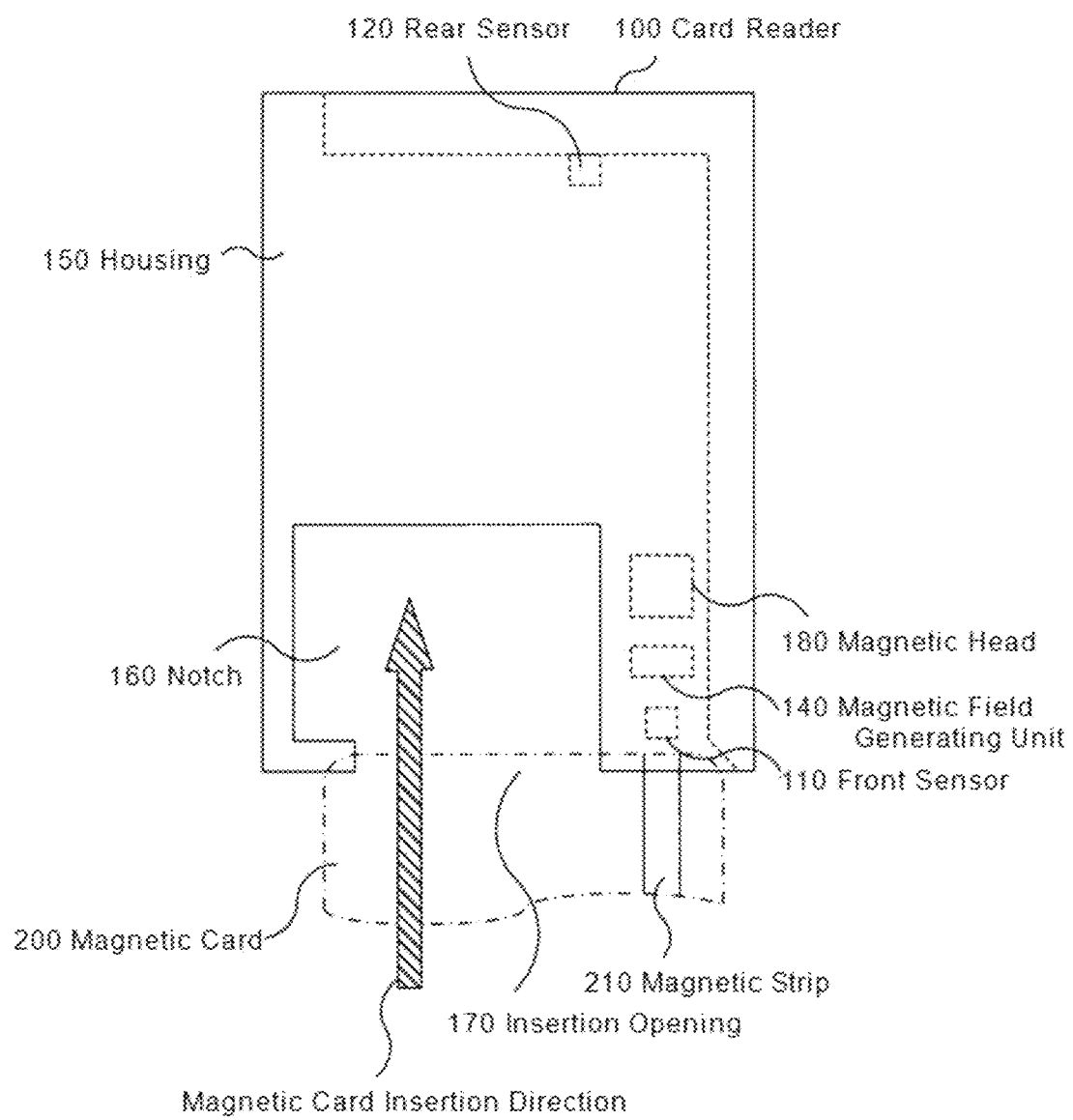
FIG. 2 is a diagram showing an example of an exterior form of the card reader shown in FIG. 1.

FIG. 2 is a diagram showing an example of the exterior form of the card reader 100 shown in FIG. 1. As shown in FIG. 2, at the insertion opening 170 of the housing 150 of the card reader 100 at which a magnetic card 200 as a medium is inserted, a notch 160 is created so that a magnetic card 200 can be inserted or removed by hand. Inside the housing 150, the front senor 110, the rear sensor 120, the magnetic field generating unit 140 and a magnetic head 180 are arranged. The front sensor 110, the rear sensor 120 and the magnetic field generating unit 140 are also shown in FIG. 1. While the magnetic card 200 is inserted into the housing 150, the magnetic head 180 reads information on a magnetic stripe 210; and/or it writes information on the magnetic stripe 210. In this embodiment, the magnetic head 180 reads information from the magnetic stripe 210 on the magnetic card 200 at the time of the removal of the magnetic card 200 from the card reader 100. In this embodiment, the magnetic head 180 also writes information on the magnetic stripe 210 of the magnetic card 200 at the time of the removal of the magnetic card 200 from the card reader 100. It may be configured such that the magnetic head 180 reads information from the magnetic stripe 210 or writes information on the magnetic stripe 210 at the time of the insertion of the card 200 into the card reader 100. Note that although not illustrated in FIG. 2, the control unit 130 shown in FIG. 1 is arranged inside the housing 150 alongside the front sensor 110, the rear sensor 120 and the magnetic field generating unit 140. Also, the distance between the front sensor 110 and the rear sensor 120 is the same as the length of a regular magnetic card in the insertion direction.

The first strength and the second strength of the magnetic field is next described. The first strength is strong enough to cause an interfering magnetic field to countermeasure skimming. Also, the second strength is the strength of the magnetic field which does not affect the operation of the magnetic head 180 to read information from the magnetic stripe 210 on the magnetic card 200 or to write information on the magnetic stripe. The second strength may have the value of "0 (zero)" or close to "0 (zero)".

Figure 3:
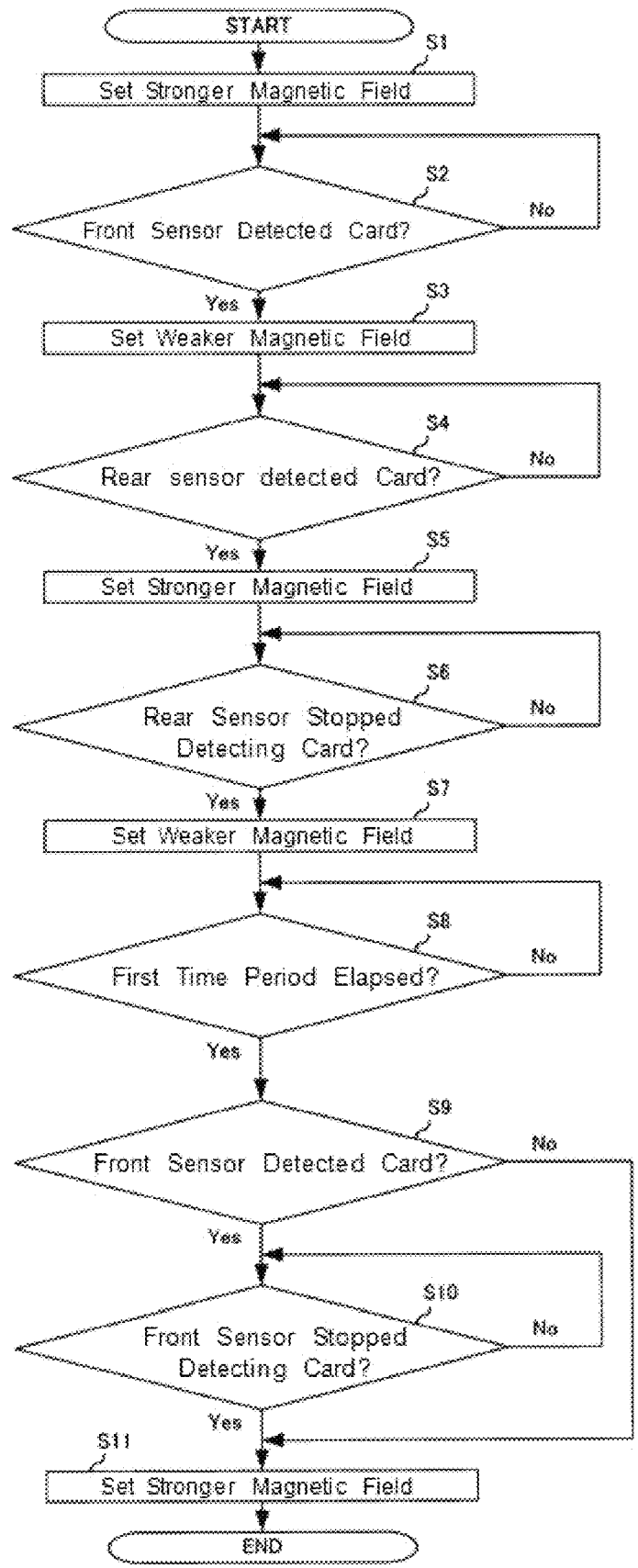
FIG. 3 is a flowchart to explain an example of a control method in the card reader shown in FIG. 1.

A control method of the card reader 100 shown in FIG. 1 is described hereinafter. FIG. 3 is a flowchart to explain on example of a control method of the card reader shown in FIG. 1.

First, the control unit 130 sets the magnetic field to be generated by the magnetic field generating unit 140 to the stronger magnetic field; the magnetic field generating unit 140 generates magnetic field (Step S1). Then, when the magnetic card 200 is inserted into the housing 150 of the card reader 100, the control unit 130 judges if the front sensor 110 has detected the magnetic card 200 (Step S2). The control unit 130 may judge whether the detection of the magnetic card 200 by the front sensor 110 was due to the insertion of the magnetic card 200 into the housing 150 of the card reader 100, based on the detection situation thus far such as when the front sensor 110 has detected the magnetic card after a predetermined time period elapsed after both the front sensor 110 and the rear sensor 120 had stopped sensing the magnetic card 200. When the reading of information from a magnetic stripe 210 or the writing of information on the magnetic stripe 210 is performed at the time of the insertion of the magnetic card 200, once the front sensor 110 detects the magnetic card 200, the control unit 130 sets the magnetic field to be generated by the magnetic field generating unit 140 to the weaker magnetic field (Step S3). Then, it is judged whether the rear sensor 120 has detected the magnetic card 200 (Step S4). If it is judged that the rear sensor 120 has detected the magnetic card 200, the control unit 130 judges that the magnetic card 200 is completely inserted into the card reader 100 and sets the magnetic field to be generated by the magnetic field generating unit 140 to the stronger magnetic field (Step S5). Note that even when the rear sensor 120 does not detect the magnetic card in Step S4, the control unit 130 may set the magnetic field to be generated by the magnetic field generating unit 140 to the stronger magnetic field after a predetermined time period has elapsed (the second period) after the front sensor 110 detected the magnetic card 200.

After that, it is judged whether the rear sensor 120 has stopped detecting the magnetic card 200 (Step S6). The processing of Step S6 is to judge if the removal of the magnetic card 200 from the card reader 100 has begun. In other words, when the removal of the magnetic card 200 from the card reader 100 begins, the rear sensor 120 which has been detecting the magnetic card 200 thus far stops detecting the card 200. When it is judged in Step S6 that the rear sensor 120 no longer detects the magnetic card 200, the control unit 130 sets the magnetic field to be generated by the magnetic field generating unit 140 to the stronger magnetic field (Step S7). Also, the control unit 130 judges whether a predetermined time period (the first period) has elapsed after the rear sensor 120 stopped sensing the magnetic card 200 (Step S8). If a predetermined time period (the first period) has not elapsed, the control unit 130 judges that the magnetic card 200 is not yet removed from the card reader 100, and maintains the magnetic field generated by the magnetic field generating unit 140 at the weaker magnetic field. The processing of maintaining this magnetic field is implemented to prevent a misjudge that the magnetic card 200 is no longer inserted in the housing 150 of the card reader 100 (the removal of the card from the housing 150 is completed) since neither of the two sensors provided to detect the magnetic card 200 detects the magnetic card 200 when the front sensor 110 has not yet detected the magnetic card 200 after the rear sensor 120 has stopped detecting the card 200, and therefore, to prevent setting the magnetic field to be generated by the magnetic field generating unit 140 to the stronger magnetic field.

After a predetermined time period (the first period) elapsed, it is judged whether the front sensor 110 has detected the magnetic card 200 (Step S9). Note that there may be a case that the front sensor 110 detects the magnetic card 200 before the first time period elapses. Therefore, the processing of Step S9 may be implemented without Step S8 after the processing of Step S7, In the case that the front sensor 110 has detected the magnetic card 200, it is judged whether the front sensor 110 has stopped sensing the magnetic card 200 (Step S10). When the front sensor 100 has stopped sensing the magnetic card 200, the control unit 130 judges that the magnetic card 200 has been pulled out of the housing 150 of the card reader and sets the magnetic field to be generated by the magnetic field generating unit 140 to the stronger magnetic field (Step S11). Note that, in the case in which the front sensor 110 detects the magnetic card 200 during the predetermined time period (the third period) although, after detecting the magnetic card 200, the rear sensor 120 does not stop sensing it, the control unit 130 may set the magnetic field to be generated by the magnetic field generating unit 140 to the weaker magnetic field. This makes it possible to correspond to a case that a magnetic card 200 having a longer length than a normal size is inserted.

On the other hand, in the case in which the front sensor 110 does not detect the magnetic card 200 even after the predetermined time period has elapsed after the rear sensor 120 stopped sensing the magnetic card 200 in Step S9, the control unit 130 sets the magnetic field to be generated by the magnetic field generating unit 140 to the stronger magnetic field.

In this embodiment, for the predetermined time period after the rear sensor 120 stops sensing the magnetic card 200, which has been inserted to the housing 150 of the card reader 100, due to the start of a manual removal of the card, the control unit 130 judges that the magnetic card 200 is inside the housing 150 of the card reader and therefore, maintains the magnetic field to be generated by the magnetic field generating unit 140 at the weaker magnetic field. Therefore, even when a magnetic card 200 in other dimensions than a normal size, which may cause a time lag in which neither of the two sensors detects the magnetic card 200, is inserted and pulled out, the control unit is prevented from judging that the magnetic card 200 is not inside the housing 150 of the card reader 100 (that the card 200 is completely pulled out from the housing 150), thus preventing the magnetic card 200 from being lost track of A magnetic card in other dimensions than a normal size is a magnetic card having a shorter length than a normal size (the length), a magnetic card with a chipped corner, or a magnetic card having a nonstandard corner roundness, R, for example. The interruption of the processing of reading information from the magnetic card 200 can be prevented by preventing the magnetic card 200 from being lost track of, thus improving the reading performance. Also, the interfering magnetic field is prevented from affecting the processing on the magnetic card 200.

As above, each function (processing) has been described associated with each component; however, the assignment is not limited to the above. Even the configuration of the components is only an example and is not limited to the above embodiment. Also, the present invention can be applied to a card reader 100 which transfers a magnetic card automatically.

DESCRIPTION OF CODES

Reference Numerals

100 Card reader
110 Front sensor
120 Rear sensor
130 Control unit
140 Magnetic field generating unit
150 Housing
160 Notch
170 Insertion opening
180 Magnetic head
200 Magnetic card
210 Magnetic stripe

What is claimed:

1. A magnetic recording medium processing device which reads information from an inserted magnetic card and writes information to said magnetic card, comprising:

a first detecting unit arranged near an insertion opening for said magnetic card configured to detect the insertion of said magnetic card;

a second detecting unit arranged further from the insertion opening than the first detecting unit, in a direction of insertion of the magnetic card, configured to detect said magnetic card when said magnetic card is fully inserted;

a magnetic field generating unit configured to generate an interfering magnetic field in the vicinity of said insertion opening for said magnetic card; and a control unit configured to control said interfering magnetic field to be generated by said magnetic field generating unit at a first strength, when said magnetic card is not being read by said device, said interfering magnetic field at said first strength being strong enough to impair the functioning of a card skimmer proximate the insertion opening and configured to control said interfering magnetic field to be generated by said magnetic field generating unit at a second non-zero strength which is weaker than said first strength when said magnetic card is being read by said device, wherein said second strength interfering magnetic field does not affect reading of the magnetic card;

wherein said control unit controls the strength of a magnetic field to be generated by said magnetic field generating unit at said second strength when a first predetermined time period elapses after said second detecting unit detects said magnetic card and then no longer detects said magnetic card, wherein said magnetic recording medium processing device is a non-motorized magnetic recording medium processing device at which said magnetic card is inserted into the interior of the device by hand and removed by hand from the interior of the device, and wherein when said first detecting unit detects said magnetic card after said second detecting unit has detected said magnetic card first and then stopped sensing said magnetic card, said control unit maintains the strength of a magnetic field to be generated by said magnetic field generating unit at said second strength until said first detecting unit stops sensing said magnetic card, upon which the control unit changes the strength of the magnetic field to be generated at said first strength.

2. The magnetic recording medium processing device as set forth in claim 1, wherein said control unit controls the strength of a magnetic field to be generated by said magnetic field generating unit at said first strength before said magnetic card is inserted; when said magnetic card is inserted and said first detecting unit detects said magnetic card, said control unit controls the strength of the magnetic field to be generated by said magnetic field generating unit at said second strength from the time of said detection until a second time period elapses.

3. The magnetic recording medium processing device as set forth in claim 2, wherein when said second detecting unit detects said magnetic card after said first detecting unit detects said magnetic card, said control unit controls the strength of the magnetic field to be generated by said magnetic field generating unit at said first strength.

4. The magnetic recording medium processing device as set forth in claim 2, wherein the distance between a position at which said first detecting unit detects said magnetic card and a position at which said second detecting unit detects said magnetic card is the same as the length of said magnetic card in the insertion direction.

5. The magnetic recording medium processing device as set forth in claim 3, wherein
when said first detecting unit detects said card while a third time period elapses after said second detecting unit has detected said magnetic card, said control unit controls the strength of a magnetic field to be generated by said magnetic field generating unit at said second strength.

6. The magnetic recording medium processing device as set forth in claim 3, wherein
the distance between a position at which said first detecting unit detects said magnetic card and a position at which said second detecting unit detects said magnetic card is the same as the length of said magnetic card in the insertion direction.

7. The magnetic recording medium processing device as set forth in claim 1, wherein
when said second detecting unit detects said magnetic card after said first detecting unit detects said magnetic card, said control unit controls the strength of the magnetic field to be generated by said magnetic field generating unit at said first strength.

8. The magnetic recording medium processing device as set forth in claim 7, wherein
when said first detecting unit detects said card while a third time period elapses after said second detecting unit has detected said magnetic card, said control unit controls the strength of a magnetic field to be generated by said magnetic field generating unit at said second strength.

9. The magnetic recording medium processing device as set forth in claim 7, wherein
the distance between a position at which said first detecting unit detects said magnetic card and a position at which said second detecting unit detects said magnetic card is the same as the length of said magnetic card in the insertion direction.

10. The magnetic recording medium processing device as set forth in claim 1, wherein
the distance between a position at which said first detecting unit detects said magnetic card and a position at which said second detecting unit detects said magnetic card is the same as the length of said magnetic card in the insertion direction.

11. The magnetic recording medium processing device as set forth in claim 1, wherein
the distance between a position at which said first detecting unit detects said magnetic card and a position at which said second detecting unit detects said magnetic card is the same as the length of said magnetic card in the insertion direction.

12. A control method of a magnetic recording medium processing device, the method comprising:
a processing of detecting the insertion of said magnetic card in the vicinity of an insertion opening for a magnetic card;
a processing of detecting said magnetic card at an insertion complete position at which said magnetic card can be detected when said magnetic card is fully inserted;
a processing of generating magnetic field in the vicinity of said magnetic card insertion opening;
a processing of controlling an interfering magnetic field to be generated at a first strength strong enough to impair the functioning of a card skimmer proximate the insertion opening and at a second non-zero strength which is weaker than said first strength when said magnetic card is being read by said device, wherein said second strength interfering magnetic field does not affect reading of the magnetic card;
a processing of controlling a magnetic field to be generated at said second strength when a first time predetermined period elapses after said magnetic card is detected at said insertion complete position and then is no longer detected at said insertion complete position,
wherein said magnetic recording medium processing device is a non-motorized magnetic recording medium processing device at which said magnetic card is inserted into the interior of the device by hand and removed from the interior of the device, by hand, and
wherein when a first detecting unit detects said magnetic card after a second detecting unit has detected said magnetic cad first and then stopped sensing said magnetic card, said second detecting unit being arranged further from the insertion opening than the first detecting unit, in a direction of insertion of the magnetic card, a control unit maintains the strength of a magnetic to be generated by a magnetic field generating unit at said second strength until said first detecting unit stops sensing said magnetic card, upon which the control unit changes the strength of the magnetic field to be generated at said first strength.

13. The control method as set forth in claim 12,
a processing of controlling a magnetic field to be generated at said first strength until the magnetic card is inserted; and then
a processing of controlling a magnetic field to be generated at said second strength while a second time period elapses once said magnetic card is inserted and then said magnetic card is detected in the vicinity of said magnetic card insertion opening.

14. The control method as set forth in claim 12,
a processing of controlling a magnetic field to be generated at said first strength once said magnetic card is detected at said insertion complete position after said magnet card is detected in the vicinity of said magnetic card insertion opening.

15. The control method as set forth in claim 14,
a processing of controlling a magnetic field to be generated at said second strength in the case the said magnet card is detected in the vicinity of said magnetic card insertion opening while a third time period elapses once said magnetic card is inserted at said insertion complete position.

* * * * *